H. W. SHEEHY.
ELECTROMAGNETIC SWITCH.
APPLICATION FILED AUG. 31, 1910.
1,001,313.
Patented Aug. 22, 1911.
2 SHEETS—SHEET 1.
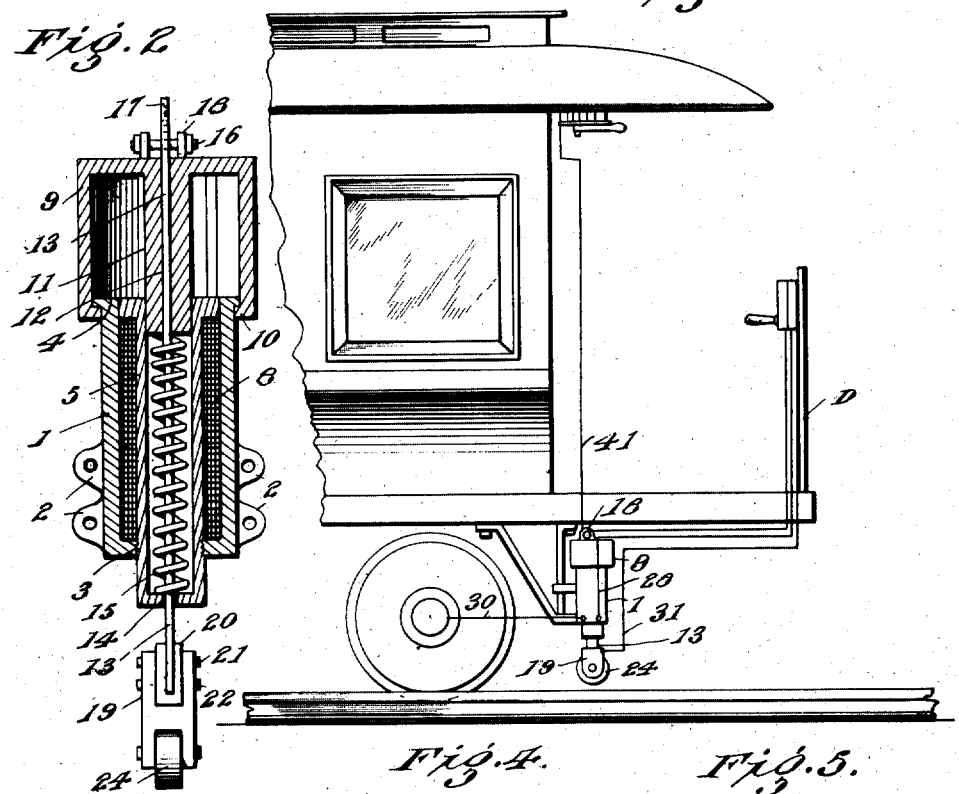
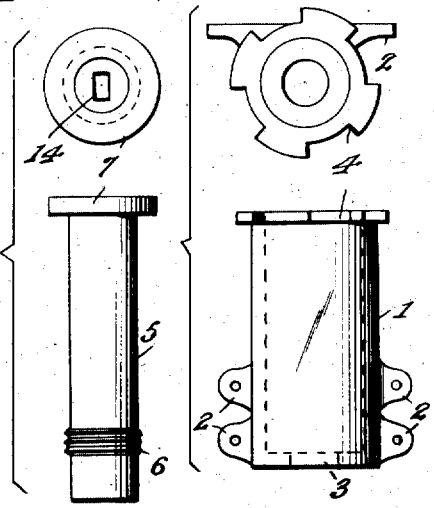
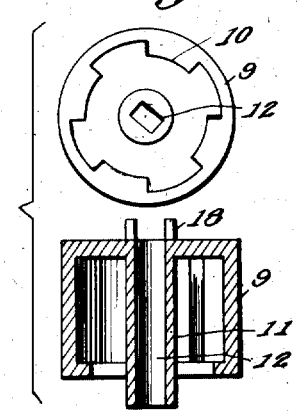
Witnesses
Inventor
H. W. Sheehy
By _____ Attorney H. W. SHEEHY.
ELECTROMAGNETIC SWITCH.
APPLICATION FILED AUG. 31, 1910.
1,001,313.
Patented Aug. 22, 1911.
2 SHEETS—SHEET 2.
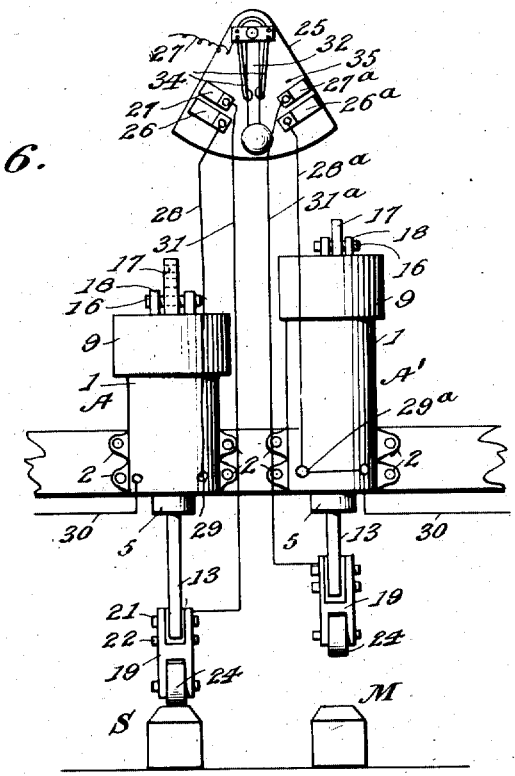
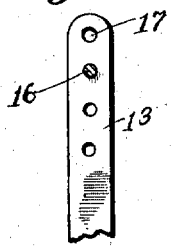
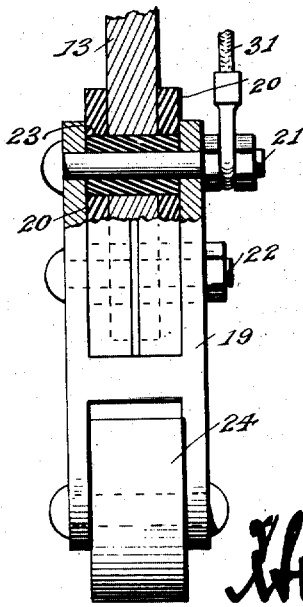
Witnesses
Cora K. Handy
W. F. Woodson
Inventor
H. W. Sheehy
Harr Racey, Attorneys

UNITED STATES PATENT OFFICE.

HARRY W. SHEEHY, OF AKRON, OHIO.

ELECTROMAGNETIC SWITCH.

1,001,313.  Specification of Letters Patent.  Patented Aug. 22, 1911.

Original application filed May 25, 1910, Serial No. 563,419. Divided and this application filed August 31, 1910. Serial No. 579,914.

*To all whom it may concern:*

Be it known that I, HARRY W. SHEEHY, citizen of the United States, residing at Akron, in the county of Summit and State of Ohio, have invented certain new and useful Improvements in Electromagnetic Switches, of which the following is a specification.

This invention comprehends certain new and useful improvements in circuit controlling apparatus designed for use particularly in connection with electric railway switches, the present invention relating primarily to an electromagnetic switch.

The primary object of the invention is a simple, durable construction of magnetic switch which will be capable of being cheaply manufactured and the parts readily assembled and which will not be liable to get out of order.

The invention also has for its object an improved construction of an electromagnetic switch designed particularly as above noted for use with electrically operated street or other electric railway-cars, the same embodying a very simple arrangement of contact bar carried by the movable core of an electromagnet and designed to engage a contact rail or the like to close the main circuit for operating the switch points or frogs. And the invention also has for its object to generally improve this class of devices and render them simple in construction as well as durable and not liable to get out of order, and to also render them more commercially desirable.

With these and other objects in view as will more fully appear as the description proceeds, the invention consists in certain constructions, arrangements and combinations of the parts that I shall hereinafter fully describe and claim.

For a full understanding of the invention, reference is to be had to the following description and accompanying drawings in which:

Figure 1 is a side elevation of a portion of a street railway car equipped with the improvements of the invention; Fig. 2 is an enlarged vertical sectional view of an improved electromagnetic switch; Figs. 3, 4 and 5 illustrate details of the switch; Fig. 6 is a longitudinal view of two of the electromagnetic switches; Fig. 7 is a detail view of the contact bar employed, the same being only partly shown in section, and partly broken away. Fig. 8 is a detail side view of a portion of a contact bar hereinafter more specifically described.

Corresponding and like parts are referred to in the following description and indicated in all the views of the accompanying drawings by the same reference characters.

In the present embodiment of my invention, the same is shown as part of an electrically actuated railway switch operating mechanism which includes conductor rails S and M, indicating that when the rail S is engaged by one of the operating or contact bars carried by the car, the switch or frog will be moved so that the car can take the siding, and that when the conductor rail M is engaged by the other contact bar, the switch will be moved from the car to continue on the main track or move over from the siding. In this connection, it may be stated that the present case is a divisional application of my co-pending application for patent for circuit controlling apparatus filed on or about the 25th day of May, 1910, Serial No. 563,419. Each of the electromagnetic switches disclosed in the copending application just mentioned embodies the subject matter of the present invention and it will therefore be only necessary to describe one of the switches in detail.

Referring now to the drawing, it will be noted that each of the switches embodies a preferably cylindrical casing 1 secured to the support designed to hold it as by oppositely projecting pairs of apertured lugs 2, said casing being formed at its lower end with a screw-threaded opening 3 and being provided at its upper end with equally spaced outstanding segmental lugs 4. A barrel 5 is designed to fit within the casing 1, the barrel being formed on its exterior wall intermediate of its ends with screw threads 6 designed to engage the threads of the opening 3, whereby the lower end of the barrel will protrude to some extent below the bottom of the casing 1. The parts are preferably so proportioned that when they are thus connected, the annular outstanding flange 7 which is formed on the upper end of the barrel lies substantially flush with the upper edge of the casing 1. A magnetic coil 8 encircles the barrel 5 and preferably fills the space between the exterior wall of the barrel and the adjoining or interior wall of the casing 1, as clearly illustrated in Fig. 2, the coil extending from the flange 7 to the bottom of the casing 1.

A cylindrical cap 9 is adapted to fit over the top of the casing 1 with its inclosed barrel 5, said cap 9 being formed at its lower edge with inwardly extending segmental lugs 10 designed to interlock with the outstanding lugs 4 of the casing 1, so as to permit the cap to be slipped over the upper end of the casing and then given a slight turn to interlock the parts. The cap 9 is also formed with a centrally disposed and longitudinally extending stem 11, said stem being formed with a longitudinal opening 12 extending entirely therethrough and through the top of the cap, said opening being designed to receive a contact bar 13 which may be of any desired length, according to the requirements of the case. The contact bar 13 extends entirely through the stem 11 and downwardly entirely through the barrel 5, projecting out of the lower end of the barrel and through an opening 14 formed therein. A coil expansion spring 15 encircles the contact bar 13 and is mounted within the barrel 5, the lower end of the spring bearing against the bottom of the barrel and the upper end of the spring bearing against the lower end of the stem 11, such end of the stem being received and guided in the upper end of the barrel 5, as shown. It will thus be understood, that in the normal position of the parts with the magnets deenergized, the spring 15 will be permitted to exert its full tension and hold the cap 9 at the upper limit of its movement, that is, with the lugs 10 in engagement with the lugs 4. Upon the energization of the magnet, the stem 11 will move as a core, and be drawn downwardly so as to compress the spring and at the same time carry the contact bar 13 downwardly, it being noted that said contact bar is connected to the cap as by a bolt or pin 16 which passes through any one of a series of openings 17 formed in the bar at the upper end of the latter and through upright ears 18 which are formed on the top of the cap 9.

The contact bar 13 is received at its lower end in the upper end of a fork 19, and is preferably increased in fiber insulating sections 20. The bar 13 is secured within the prongs of the fork by upper and lower transverse bolts 21 and 22 fiber insulating bushings 23 surrounding the bolts as clearly illustrated in Fig. 7. The fork 19 carries a roller 24 which is journaled in the lower end of the fork and which is adapted for contact with the conductor rail.

The two electromagnetic switches which are used to illustrate one application of my invention, are designated A and A' and are controlled and operated by a hand operated switch comprising a base plate 25 which is shown as secured in a vertical position to the dash board D of a car. The base 25 has four contact members connected thereto, said members being arranged in pairs between the opposite side edges of the base and preferably embodying spring plates having one end attached to the base and the other slightly offset therefrom. These members are designated 26 and 26ª and 27 and 27ª. A conducting wire 28 connects the contact member 26 with one end of the coil 8 of the magnet A as at 29 and a conducting wire 28ª similarly connects the contact member 26ª with one end of the coil 8 of the magnet A' as indicated at 29ª. The other ends of the two coils are grounded as by wires 30 connected thereto and to the car truck. The contact member 27 is connected by a conductor wire 31 to the bolt 21 of one of the forks 19, and the contact member 27ª is similarly connected by a conductor wire 31ª to the bolt 21 of the other fork 19. To close the various circuits, I have provided a switch handle 32 which is journaled, and supported for a laterally swinging movement on the base plate 25. A movement of the switch handle in one direction will cause it to engage the contact member 26, and a continued movement of the switch handle in the same direction will cause it to engage the contact member 27. A movement of the switch handle in the opposite direction will first cause it to contact with the member 26ª, and a continued movement in this last named direction will cause the switch handle to contact with the member 27ª. This is due to the fact that the contact members 26 and 26ª are longer than the complementary members 27 and 27ª, extending inwardly toward the middle of the base plate farther than said members 27 and 27ª.

41 designates the feed wire which may receive its current from any suitable source of supply, said feed wire being operatively connected to the switch handle 32 and the current being thereby conducted to the members above described, when any one of them is overlapped by the switch handle.

In the practical use of my improved electromagnetic switches in the application of the invention illustrated in the accompanying drawings, when the motor-man desires to actuate the track switch say for the siding, he will move the switch handle in the required direction which will first drive said handle into engagement with, say, the contact member 26, and the current will then flow from the feed wire 41 through the contact member 26, through the contact wire 28 and through the electromagnet A thereby energizing said magnet and causing the core or stem 11, and the cap 9 which carries it, to move downwardly, whereby the contact bar is carried downwardly, to effect its engagement with the conductor rail below it. A continued movement of the switch handle 32 in the same direction will cause the current to flow through the contact member 27, conductor wire 31 and the corresponding fork 19, the actuating circuit for the track switch being thereby closed and the switch point thrown in any preferred manner well known to those skilled in the art to which my invention appertains, as for instance, by a mechanism like that illustrated in my prior Letters Patent of the United States, #949,404 issued to me February 15, 1910. Obviously, the movement of the switch handle in the opposite direction will first energize the electromagnet circuit, and then close the actuating circuit for moving the switch point in the opposite direction. In either event, it is clear that there is no current in the fork and wheel until after it has made the proper connection with the conductor rail, all sparking at the point of contacts being thereby prevented. In the reverse movement to open the circuit which operates the switch point of the fork, the latter will be operated before the magnet circuit, and all liability to the formation of arcs and destructive burning of the contact will be precluded both when the circuits are closed and when they are being opened. In order to open the circuits, it is only necessary for the operator to release the switch handle 32, whereupon the spring arms 34 will act to swing the handle back to its middle or neutral position.

Having thus described the invention, what is claimed as new is:

1. In an apparatus of the character described, an electromagnet comprising a casing, a barrel secured within the casing and spaced from the walls thereof, a coil in the space between the barrel and the casing, the casing being provided at one end with spaced segmental lugs, a cap adapted to be slipped over said end of the casing and formed with corresponding interlocking lugs whereby to limit the movement of the cap on the casing in one direction, the cap being provided with a stem movable within the barrel, and a contact-bar secured to the stem and extending through the barrel.

2. In an apparatus of the character described, an electromagnet comprising a casing, a barrel secured within the casing and spaced from the walls thereof, a coil in the space between the barrel and the casing, the casing being provided at one end with outstanding spaced segmental lugs, a cap adapted to be slipped over the end of the casing and formed with oppositely extending interlocking lugs whereby to limit the movement of the cap on the casing in one direction, the cap being provided with a stem movable within the barrel, a contact bar extending through the stem and barrel, a spring encircling said bar and bearing against the stem and the bottom of the barrel, the cap being provided with lugs and the contact bar being provided with an opening and a bolt passed through said opening and lugs whereby to secure the contact bar to the cap.

3. An electromagnet comprising a casing formed with a screw-threaded bottom opening, a barrel mounted in said casing and spaced from the walls thereof, and having a screw-threaded connection with the bottom opening of the casing, a coil mounted within the casing between the barrel and the casing, said barrel being provided at its upper end with an outstanding flange flush with the top of the casing, a cap having a longitudinal movement on the casing, and provided with a stem extending down into the barrel, and a contact bar secured to the cap and mounted in the barrel.

In testimony whereof I affix my signature in presence of two witnesses.

HARRY W. SHEEHY. [L. S.]

Witnesses:
CHARLES HULFINCH,
GEO. W. W. CARRY.

Copies of this patent may be obtained for five cents each, by addressing the "Commissioner of Patents, Washington, D. C."